US010958984B2

(12) United States Patent
Earnshaw

(10) Patent No.: US 10,958,984 B2
(45) Date of Patent: Mar. 23, 2021

(54) FUTURE-PROOFED CONTROL SIGNALING

(71) Applicant: One Media, LLC, Hunt Valley, MD (US)

(72) Inventor: Mark Earnshaw, Kanata (CA)

(73) Assignee: One Media, LLC, Hunt Valley, MD (US)

( * ) Notice: Subject to any disclaimer, the term of this patent is extended or adjusted under 35 U.S.C. 154(b) by 224 days.

(21) Appl. No.: 15/650,313

(22) Filed: Jul. 14, 2017

(65) Prior Publication Data

US 2018/0020264 A1 Jan. 18, 2018

Related U.S. Application Data

(60) Provisional application No. 62/362,707, filed on Jul. 15, 2016.

(51) Int. Cl.
*H04N 21/647* (2011.01)
*H04N 21/2362* (2011.01)
(Continued)

(52) U.S. Cl.
CPC ..... *H04N 21/64784* (2013.01); *H04L 1/0041* (2013.01); *H04N 21/2362* (2013.01);
(Continued)

(58) Field of Classification Search
CPC ............. H04N 21/631; H04N 21/6547; H04N 21/2362; H04N 21/615; H04N 21/64784; H04L 1/0041
(Continued)

(56) References Cited

U.S. PATENT DOCUMENTS

2012/0257586 A1* 10/2012 Mourad ................. H04H 20/16 370/329
2012/0320932 A1* 12/2012 Xu .......................... H04L 69/22 370/474
(Continued)

FOREIGN PATENT DOCUMENTS

CN 105162564 A 12/2015
CN 105580342 A 5/2016
(Continued)

OTHER PUBLICATIONS

ATSC S32-230r56 Physical Layer Protocol ATSC Proposed Standard: Physical Layer Protocol (A/322), Jun. 29, 2016 & nbsp;(Jun. 29, 2016), XP055290202, Retrieved from the Internet: URL:http://atsc.org/wp-content/uploads/2015/10/A322S32-230r56-Physical-Layer-Protocol.pdf.*

(Continued)

*Primary Examiner* — Hai V Tran
(74) *Attorney, Agent, or Firm* — Sterne, Kessler, Goldstein & Fox P.L.L.C.

(57) ABSTRACT

Systems and methods for future-proofed control signaling are disclosed herein. A waveform enabling broadcast transmission of physical layer frames having variable parameters can be extended to allow for future additions to the control signaling structure without breaking compatibility with existing receivers. In some embodiments, new signaling parameters can be added in an existing portion of a preamble and the length of the modified parameter set can be indicated to legacy receivers. In some embodiments new signaling parameters can be added at the end of the existing preamble and viewed as reserved bits by legacy receivers.

20 Claims, 20 Drawing Sheets

1400

| Syntax | # of bits | Format |
|---|---|---|
| L1_Detail_signaling() { | | |
| L1D_version | 4 | uimsbf |
| ... | | |
| for i=0 .. L1B_num_subframes { | | |
| ***L1D_subframe_num_signaling_bits*** | $n_{sub\_bits}$ | uimsbf (1402) |
| if (i > 0) { | | |
| L1D_mimo | 1 | uimsbf |
| L1D_miso | 2 | uimsbf |
| L1D_fft_size | 2 | uimsbf |
| L1D_reduced_carriers | 3 | uimsbf |
| L1D_guard_interval | 4 | uimsbf |
| L1D_num_ofdm_symbols | 11 | uimsbf |
| L1D_scattered_pilot_pattern | 5 | uimsbf |
| L1D_scattered_pilot_boost | 3 | uimsbf |
| L1D_sbs_first | 1 | uimsbf |
| L1D_sbs_last | 1 | uimsbf |
| } | | |
| ... | | |
| } | | |
| L1D_reserved | as needed | uimsbf |
| L1D_crc | 32 | uimsbf |
| } | | |

(51) Int. Cl.
*H04N 21/6547* (2011.01)
*H04N 21/63* (2011.01)
*H04L 1/00* (2006.01)
*H04N 21/61* (2011.01)

(52) U.S. Cl.
CPC ......... *H04N 21/615* (2013.01); *H04N 21/631* (2013.01); *H04N 21/6547* (2013.01)

(58) Field of Classification Search
USPC .............. 725/54, 62, 116; 370/329; 375/295
See application file for complete search history.

(56) References Cited

U.S. PATENT DOCUMENTS

| | | | | |
|---|---|---|---|---|
| 2016/0294509 | A1* | 10/2016 | Shin | H04L 1/0041 |
| 2017/0026432 | A1* | 1/2017 | Park | H04L 27/2666 |
| 2017/0294987 | A1* | 10/2017 | Kwon | H04L 1/0071 |
| 2017/0359147 | A1* | 12/2017 | Park | H03M 13/6325 |
| 2018/0241790 | A1* | 8/2018 | Park | H04L 1/0071 |
| 2018/0359520 | A1* | 12/2018 | Takahashi | H04N 21/438 |
| 2019/0007249 | A1* | 1/2019 | Lee | H04L 27/2627 |

FOREIGN PATENT DOCUMENTS

| | | | |
|---|---|---|---|
| CN | 105594216 | A | 5/2016 |
| CN | 105765943 | A | 7/2016 |

OTHER PUBLICATIONS

ATSC S32-230r56 Physical Layer Protocol ATSC Proposed Standard: Physical Layer Protocol (A/322), Jun. 29, 2016 & nbsp;(Jun. 29, 2016), XP055290202, Retrieved from the Internet: URL:http://atsc.org/wp-content/uploads/2015/10/A322S32-230r56-Physical-Layer-Protocol.pdf.*

Physical Layer Time Interleaving for the ATSC 3.0 System Peter Klenner, Jong-Seob Baek, Nabil Sven Loghin, David Gómez-Barquero, and Woo-Suk Ko (Jan. 2016 IEEE Transactions on Broadcasting) DOI: 10.1109/TBC.2015.2505410 (Year: 2016).*

"ETSI EN 302 755 V1.4.1—Digital Video Broadcasting (DVB); Frame structure channel coding and modulation for a second generation digital terrestrial broadcasting system (DVB-T2)", European Standard, European Telecommunications Standards Institute (ETSI), 188 pages (Jul. 2015).

International Search Report and Written Opinion, dated Sep. 25, 2017, for PCT Appl. No. PCT/US2017/042118, 15 pages.

"ATSC Proposed Standard A/321: System Discovery and Signaling", Mar. 23, 2016, Advanced Television Standards Committee, Washington, DC; 28 pages.

"ATSC Candidate Standard: Physical Layer Protocol (Doc. A/322)", Doc. S32-230r56, Jun. 29, 2016, Advanced Television Standards Committee, Washington, DC; 258 pages.

Office Action and Search Report, for Chinese Patent App. No. 201780052631.X, 5 pages, dated Dec. 1, 2020.

* cited by examiner

| | Value | Forward Error Correction Method |
|---|---|---|
| 801 | 0000 | BCH + 16K LDPC |
| 802 | 0001 | BCH + 64K LDPC |
| 803 | 0010 | CRC + 16K LDPC |
| 804 | 0011 | CRC + 64K LDPC |
| 805 | 0100 | 16K LDPC only |
| 806 | 0101 | 64K LDPC only |
| 810 | 0110 - 1111 | Reserved for future use |

| Syntax | # of bits | Format | |
|---|---|---|---|
| L1_Detail_signaling() { | | | |
| … | | | |
| L1D_plp_fec_type | 4 | uimsbf | 902 |
| if (L1D_plp_fec_type∈{0,1,2,3,4,5}) { | | | |
| L1D_plp_mod | 4 | uimsbf | 904 |
| L1D_plp_cod | 4 | uimsbf | 906 |
| } | | | |
| … | | | |
| } | | | |

FIG. 9

| | Value | Time interleaving mode |
|---|---|---|
| 1001 | 00 | No time interleaving mode (neither CTI nor HTI) |
| 1002 | 01 | Convolutional time interleaving (CTI) mode |
| 1003 | 10 | Hybrid time interleaving (HTI) mode |
| 1010 | 11 | Reserved for future use |

| Syntax | # of bits | Format |
|---|---|---|
| L1_Detail_signaling() { | | |
| ... | | |
| L1D_plp_TI_mode | 2 | uimsbf |
| | | |
| if (L1D_plp_TI_mode=00) { | | |
| L1D_plp_fec_block_start | 15 | uimsbf |
| } | | |
| | | |
| if (L1D_plp_TI_mode=01) { | | |
| L1D_plp_CTI_fec_block_start | 22 | uimsbf |
| } | | |
| ... | | |
| if (L1D_plp_TI_mode=01) { | | |
| L1D_plp_CTI_depth | 3 | uimsbf |
| L1D_plp_CTI_start_row | 11 | uimsbf |
| } else if (L1D_plp_TI_mode=10) { | | |
| L1D_plp_HTI_inter_subframe | 1 | uimsbf |
| L1D_plp_HTI_num_ti_blocks | 4 | uimsbf |
| L1D_plp_HTI_num_fec_blocks_max | 12 | uimsbf |
| if (L1D_plp_HTI_inter_subframe=0){ | | |
| L1D_plp_HTI_num_fec_blocks | 12 | uimsbf |
| } else { | | |
| for (k=0..L1D_plp_HTI_num_ti_blocks) { | | |
| L1D_plp_HTI_num_fec_blocks | 12 | uimsbf |
| } | | |
| } | | |
| L1D_plp_HTI_cell_interleaver | 1 | uimsbf |
| } | | |
| ... | | |
| } | | |

| L1D_plp_TI_mode | L1-Detail signaling fields specific to that time interleaving mode | # of bits |
| --- | --- | --- |
| 00 | L1D_plp_fec_block_start | 15 |
| 01 | L1D_plp_CTI_fec_block_start | 22 |
| | L1D_plp_CTI_depth | 3 |
| | L1D_plp_CTI_start_row | 11 |
| 10 | L1D_plp_HTI_inter_subframe | 1 |
| | L1D_plp_HTI_num_ti_blocks | 4 |
| | L1D_plp_HTI_num_fec_blocks_max | 12 |
| | L1D_plp_HTI_num_fec_blocks | 12 |
| | L1D_plp_HTI_cell_interleaver | 1 |
| 11 | -- | 0 |

| Syntax | # of bits | Format |
|---|---|---|
| L1_Detail_signaling() { | | |
| L1D_version | 4 | uimsbf |
| ... | | |
| for i=0 .. L1B_num_subframes { | | |
| ***LlD_subframe_num_signaling_bits*** | $n_{sub\_bits}$ | uimsbf |
| if (i > 0) { | | |
| L1D_mimo | 1 | uimsbf |
| L1D_miso | 2 | uimsbf |
| L1D_fft_size | 2 | uimsbf |
| L1D_reduced_carriers | 3 | uimsbf |
| L1D_guard_interval | 4 | uimsbf |
| L1D_num_ofdm_symbols | 11 | uimsbf |
| L1D_scattered_pilot_pattern | 5 | uimsbf |
| L1D_scattered_pilot_boost | 3 | uimsbf |
| L1D_sbs_first | 1 | uimsbf |
| L1D_sbs_last | 1 | uimsbf |
| } | | |
| ... | | |
| } | | |
| L1D_reserved | as needed | uimsbf |
| L1D_crc | 32 | uimsbf |
| } | | |

| Syntax | # of bits | Format |
|---|---|---|
| L1_Detail_signaling() { | | |
| ... | | |
| for i=0 .. L1B_num_subframes { | | |
| ... | | |
| L1D_num_plp | 6 | uimsbf |
| | | |
| for j=0 .. L1D_num_plp { | | |
| ***L1D_plp_num_signaling_bits*** | $n_{plp\_bits}$ | uimsbf |
| L1D_plp_id | 6 | uimsbf |
| ... | | |
| } | | |
| } | | |
| L1D_reserved | as needed | uimsbf |
| L1D_crc | 32 | uimsbf |
| } | | |

| Syntax | # of bits | Format |
|---|---|---|
| L1_Detail_signaling() { | | |
| ... | | |
| L1D_plp_fec_type | 4 | uimsbf |
| if (L1D_plp_fec_type∈{0,1,2,3,4,5}) { | | |
| L1D_plp_mod | 4 | uimsbf |
| L1D_plp_cod | 4 | uimsbf |
| ***} else {*** | | |
| ***L1D_plp_fec_reserved_bits*** | $n_{fec\_bits}$ | uimsbf |
| ***}*** | | |
| ... | | |
| } | | |

| Syntax | # of bits | Format |
|---|---|---|
| L1_Detail_signaling() { | | |
| ... | | |
| L1D_plp_TI_mode | 2 | uimsbf |
| | | |
| if (L1D_plp_TI_mode=00) { | | |
| L1D_plp_fec_block_start | 15 | uimsbf |
| } | | |
| | | |
| if (L1D_plp_TI_mode=01) { | | |
| L1D_plp_CTI_fec_block_start | 22 | uimsbf |
| } | | |
| | | |
| ***if (L1D_plp_TI_mode=11) {*** | | |
| ***L1D_plp_TI_reserved_bits*** | $n_{ti\_bits}$ | uimsbf |
| ***}*** | | |
| ... | | |
| } | | |

| Syntax | # of bits | Format |
|---|---|---|
| L1_Detail_signaling() { | | |
| ... | | |
| L1D_plp_fec_type | 4 | uimsbf |
| if (L1D_plp_fec_type∈{0,1,2,3,4,5}) { | | |
| L1D_plp_mod | 4 | uimsbf |
| L1D_plp_cod | 4 | uimsbf |
| ***} else if (L1D_plp_fec_type∈{6}) {*** | | |
| ***L1D_plp_fec_parameter_0*** | $n_{fec,0}$ | uimsbf 1810 |
| ***L1D_plp_fec_parameter_1*** | $n_{fec,1}$ | uimsbf 1812 |
| ... | | |
| ***L1D_plp_fec_leftover_bits*** | $n_{fec\_bits} - \sum n_{fec,i}$ | uimsbf 1820 |
| ***} else {*** | | |
| ***L1D_plp_fec_reserved_bits*** | $n_{fec\_bits}$ | uimsbf |
| ***}*** | | |
| ... | | |
| } | | |

| Syntax | # of bits | Format |
|---|---|---|
| L1_Detail_signaling() { | | |
| ... | | |
| L1D_plp_TI_mode | 2 | uimsbf |
| | | |
| if (L1D_plp_TI_mode=00) { | | |
| L1D_plp_fec_block_start | 15 | uimsbf |
| } | | |
| | | |
| if (L1D_plp_TI_mode=01) { | | |
| L1D_plp_CTI_fec_block_start | 22 | uimsbf |
| } | | |
| | | |
| ***if (L1D_plp_TI_mode=11) {*** | | | 1910
| ***L1D_plp_TI_parameter_0*** | $n_{ti,0}$ | uimsbf | 1912
| ***L1D_plp_TI_parameter_1*** | $n_{ti,1}$ | uimsbf |
| ... | | |
| ***L1D_plp_TI_leftover_bits*** | $n_{ti\_bits} - \sum n_{ti,i}$ | uimsbf | 1920
| ***}*** | | |
| ... | | |
| } | | |

| Syntax | # of bits | Format | |
|---|---|---|---|
| L1_Detail_signaling() { | | | 2001 |
| Existing L1-Detail Signaling Goes Here | | | |
| ... | | | 2010 |
| ***for k=0 .. L1B_num_subframes {*** | | | 2011 |
| ***for m=0 .. L1D_num_plp {*** | | | 2015 |
| ***if (L1D_plp_fec_type∈{6}) {*** | | | |
| ***L1D_plp_fec_parameter_0*** | $N_{fec,0}$ | uimsbf | 2020 |
| ***L1D_plp_fec_parameter_1*** | $N_{fec,1}$ | uimsbf | 2021 |
| ***...*** | | | |
| ***}*** | | | 2017 |
| ***if (L1D_plp_TI_mode=11)) {*** | | | |
| ***L1D_plp_TI_parameter_0*** | $N_{ti,0}$ | uimsbf | 2022 |
| ***L1D_plp_TI_parameter_1*** | $N_{ti,1}$ | uimsbf | 2023 |
| ***...*** | | | |
| ***}*** | | | |
| ***}*** | | | |
| ***}*** | | | |
| | | | |
| L1D_reserved | as needed | uimsbf | |
| L1D_crc | 32 | uimsbf | |
| } | | | |

FIG. 20

FUTURE-PROOFED CONTROL SIGNALING

CROSS-REFERENCE TO RELATED APPLICATIONS

This application claims priority under 35 U.S.C. 119(e) to U.S. Provisional Patent Application No. 62/362,707 filed on Jul. 15, 2016, the contents of which are incorporated by reference herein in its entirety.

BACKGROUND

Field

The present disclosure relates to communications systems, including broadcast systems transmitting physical layer frames having variable parameter sets.

Related Art

Advanced Television Systems Committee (ATSC) 3.0, which uses spectrum devoted to broadcast transmissions, has the potential to serve many diverse scenarios ranging from conventional fixed access long-range to highly mobile medium-range broadcast applications. For example, ATSC 3.0 broadcasts could target a smartphone on a train and a television set inside a house. For this reason, ATSC 3.0 has adopted a flexible waveform with parameters that can be configured to target different receiver types.

One parameter that can be varied in ATSC 3.0 is the forward error correction type (FEC type). It is envisioned that future versions of ATSC may support even more FEC types than are currently available in ATSC 3.0. In this way, an ATSC transmitter will be able to serve users with an even more diverse set of receiver capabilities. For example, future ATSC transmissions may support turbo coding, which allows for a lower-power decoding complexity to conserve battery life while receiving ATSC signals.

Another parameter that can be varied in ATSC 3.0 is the time interleaving (TI) mode. For example, a transmitter may employ no time interleaving, convolutional time interleaving, or hybrid time interleaving. It is envisioned that future versions of ATSC may support more time interleaving types as well.

The different choices for FEC type and TI mode are associated with other parameters that are sent to receivers in a preamble to indicate how the receiver can decode the signal. Because the details of future FEC type and TI mode choices are presently unknown, there is no provision in ATSC 3.0 to support these associated parameters without redesigning the preamble. However, such a redesign would have the unwanted effect of breaking compatibility with legacy ATSC 3.0-compatible receivers.

SUMMARY

Some embodiments relate to future-proofed control signaling in broadcast networks. In some embodiments, preamble signaling enables different types of receivers to decode different physical layer pipes (PLPs) in a payload portion of a physical layer frame. In some embodiments, a first type of receiver may not be able to parse portions of the preamble signaling due to modifications in the control signaling structure. The first type of receiver may be, for example, a legacy ATSC 3.0-compatible receiver. In some embodiments, a second type of receiver may be able to parse the entire preamble. The second type of receiver may be, for example, compatible with newer versions of the ATSC protocol.

In some embodiments, the preamble comprises a parameter portion and a cyclic redundancy check (CRC). The parameter portion may comprise one or more parameter sets, each associated with a corresponding PLP in the payload portion of the physical layer frame.

Some embodiments add new signaling in the PLP parameter set associated with the PLP that the new signaling describes, such that the PLP parameter set is positioned within the parameter portion of the preamble in one contiguous block. Parameters indicating the length of a subframe parameter set, or a PLP parameter set, may be added to the preamble to allow legacy receivers to skip over incompatible parameter sets.

Some embodiments position new signaling at the end of the parameter portion of the preamble, such that the parameter set for a non-legacy PLP comprises two non-adjacent portions within the parameter portion of the preamble. A non-legacy receiver may extract the legacy parameters in the first portion of a PLP parameter set before extracting the non-legacy parameters in a second portion of the PLP parameter set. In yet further embodiments, a signal before the preamble, termed a bootstrap, signals a new type of preamble structure incompatible with the legacy receiver.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 8 illustrates an example signaling format for the legacy ATSC 3.0 L1-Detail PLP parameter L1D_plp_fec_type according to some embodiments of the disclosure.

FIG. 9 illustrates an excerpt of an example legacy L1-Detail signaling field including PLP parameter L1D_plp_fec_type according to some embodiments of the disclosure.

FIG. 10 illustrates an example signaling format for the legacy ATSC 3.0 L1-Detail PLP parameter L1D_plp_TI_mode according to some embodiments of the disclosure.

FIG. 11 illustrates an excerpt of an example legacy L1-Detail signaling field including the PLP parameter L1D_plp_TI_mode according to some embodiments of the disclosure.

FIG. 12 illustrates various parameters associated with the L1-Detail PLP parameter L1D_plp_TI_mode according to some embodiments of the disclosure.

FIG. 14 illustrates an excerpt of an example modified L1-Detail signaling field including a new parameter signaling the number of bits in each subframe parameter set according to some embodiments of the disclosure.

FIG. 15 illustrates an excerpt of an example modified L1-Detail signaling field including a new parameter signaling the number of bits in each PLP parameter set according to some embodiments of the disclosure.

FIG. 16 illustrates an excerpt of an example modified L1-Detail signaling field including a new parameter signaling one or more FEC reserved bits for future use according to some embodiments of the disclosure.

FIG. 17 illustrates an excerpt of an example modified L1-Detail signaling field including a new parameter signaling one or more TI reserved bits for future use according to some embodiments of the disclosure.

FIG. 18 illustrates an excerpt of an example future L1-Detail signaling field modification using the FEC reserved bits illustrated in FIG. 16 according to some embodiments of the disclosure.

FIG. 19 illustrates an excerpt of an example future L1-Detail signaling field modification using the TI reserved bits illustrated in FIG. 17 according to some embodiments of the disclosure.

FIG. 20 illustrates an excerpt of an example future L1-Detail signaling field modification appending all new fields at the end of the L1-Detail structure according to some embodiments of the disclosure.

Figure 1:
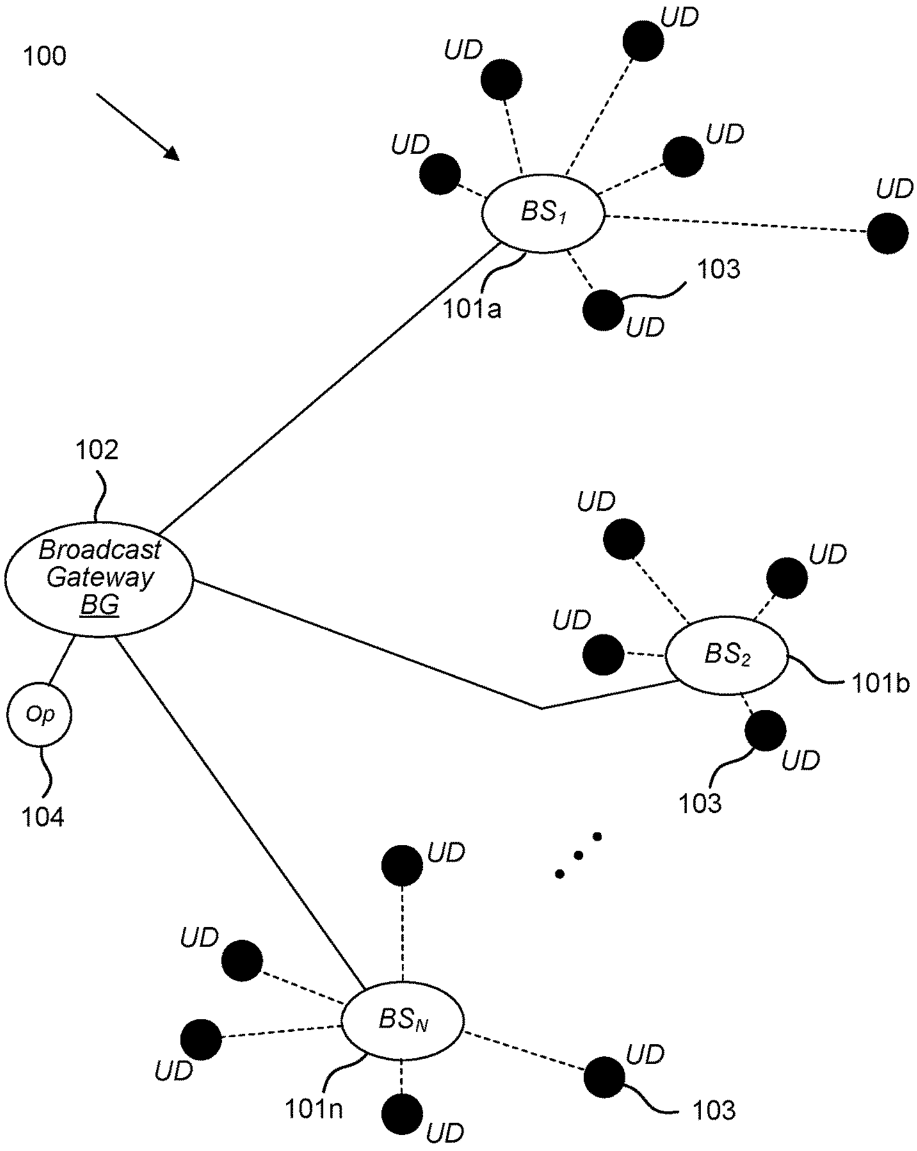
FIG. 1 illustrates a broadcast network according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

It should be appreciated that the following acronyms and abbreviations may be used herein:

ATSC Advanced Television Systems Committee
BCH Bose, Chaudhuri, Hocquenghem
BICM Bit Interleaved Coded Modulation
CRC Cyclic Redundancy Check
CTI Convolutional Time Interleaver
FEC Forward Error Correction
FFT Fast Fourier Transform
GI Guard Interval
HTI Hybrid Time Interleaver
LDPC Low Density Parity Check
MHz MegaHertz
OFDM Orthogonal Frequency Division Multiplexing
PLP Physical Layer Pipe
QAM Quadrature Amplitude Modulation
QPSK Quadrature Phase Shift Keying
RF Radio Frequency
TI Time Interleaver
uimsbf unsigned integer most significant bit first Broadcast Network Architecture In one set of embodiments, a broadcast network 100 may be configured as shown in FIG. 1. The broadcast network 100 may include a plurality of base stations 101*a*, 101*b*, . . . 101*n*, illustratively suggested by base stations $BS_1$, $BS_2$, . . . , $BS_N$ (hereinafter referred to as base stations 101). A broadcast gateway ("BG") 102 may couple to the base stations 101 through any of a variety of communication media. For example, in one embodiment, the broadcast gateway 102 may couple to the base stations 101 via the Internet, or more generally, via a computer network. Each base station 101 wirelessly transmits information to one or more user devices ("UD") 103. Each user device 103 is denoted by a solid black circle. Some of the user devices 103 may be fixed devices such as televisions or desktop computers. Other ones of the user devices 103 may be nomadic devices such as tablet computers or laptop computers. Other ones of the user devices 103 may be mobile devices such as mobile phones, automobile-based devices, aircraft-based devices, etc.

An operator ("Op") 104 of the broadcast network 100 may access the broadcast gateway 102 (e.g., via the Internet), and provide network configuration or operating instructions to the gateway 102. For example, the operator 104 may provide information such as one or more of the following items: an expected distribution of user device mobility for one or more of the base stations; the cell size of one or more of the base stations; a selection of whether the broadcast network or a subset of the network is to be operated as a single frequency network (SFN) or a multi-frequency network (MFN); a specification of how different services (e.g., television content streams) are to be assigned to different types of user devices; and identification of portions of bandwidth the broadcast network will not be using over corresponding periods of time.

The broadcast gateway 102 may determine transmission control information for one or more base stations of the broadcast network 100 based on the network configuration or operating instructions. The broadcast gateway 102 may send the transmission control information to the base stations 101 so the base stations 101 may construct and transmit physical layer frames according to the transmission control information. In other embodiments, the broadcast gateway 102 may itself generate physical layer frames to be transmitted by each base station 101 and send the physical layer frames to the base stations 101. In yet other embodiments, the broadcast gateway 102 may generate low-level instructions (e.g., physical layer instructions) for the construction of physical layer frames to the base stations 101, and send those instructions to the base stations 101, which may simply generate physical layer frames based on the instructions.

Figure 2:
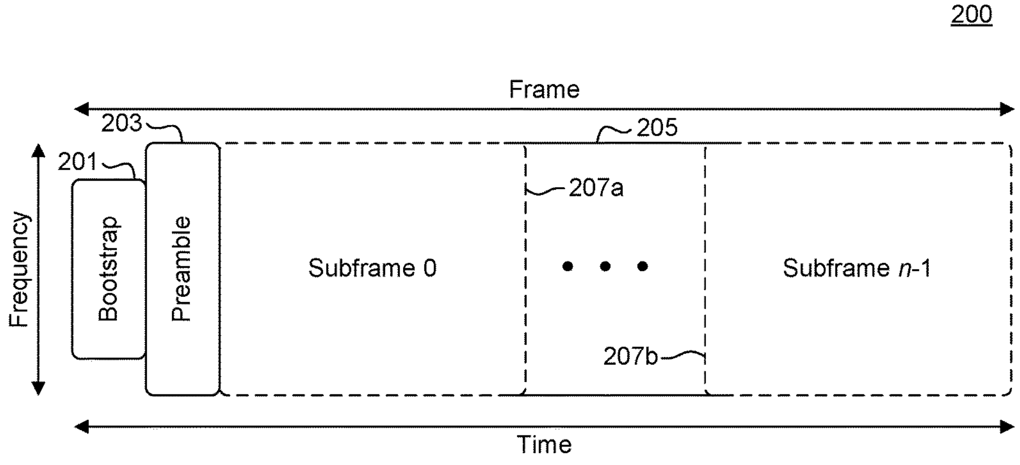
FIG. 2 illustrates a physical layer frame structure according to some embodiments of the disclosure.

FIG. 2 illustrates an embodiment of a physical layer frame 200 according to the ATSC 3.0 standard. The vertical axis of FIG. 2 illustrates the frequency dimension, whereas the horizontal axis illustrates the time dimension. In some embodiments, each frame 200 begins with a bootstrap signal 201. The bootstrap 201 can provide a receiver with information as to the nature and content of the frame 200, allowing receivers to skip decoding of the frame 200 if the receiver is not capable of or is not interested in decoding its content. The ATSC 3.0 A/321 standard includes a bootstrap 201, the details of which are hereby incorporated by reference.

In some embodiments, a preamble 203 follows the bootstrap 201. The bootstrap 201 and the preamble 203 can provide a receiver with further information as to the transmission parameters of the payload signal 205 that follows, and which the receiver ultimately wishes to decode. For example, some parameters of the preamble 203 and the payload 205, such as baseband sampling rate or preamble FFT size, can be signaled in the bootstrap 201, and the preamble 203 can signal other parameters for the payload 205 such as forward error correction type or time interleaving details. The preamble 203 comprises one or more OFDM symbols, each having a configured FFT size (e.g. 8192, 16384, 32768) and a guard interval length to mitigate inter-symbol interference.

In some embodiments, the payload 205 follows the preamble 203. The payload 205 may be divided into subframes 207*a*-207*b* as illustrated in FIG. 2. Each subframe 207*a*-207*b* of the payload 205 may be transmitted with the same BSR such that the payload 205 can be said to have a single BSR. The payload 205 comprises one or more OFDM symbols. Although not illustrated in FIG. 2, each subframe comprises one or more PLPs multiplexed together. PLPs are data structures that can be configured for a wide range of trade-offs between signal robustness and channel capacity utilization for a given data payload. Multiple PLPs can be used to carry different streams of data, all of which are required to assemble a complete delivered product. In addition, data streams required to assemble multiple delivered products can share PLPs if those data streams are to be carried with the same levels of robustness.

Figure 3:
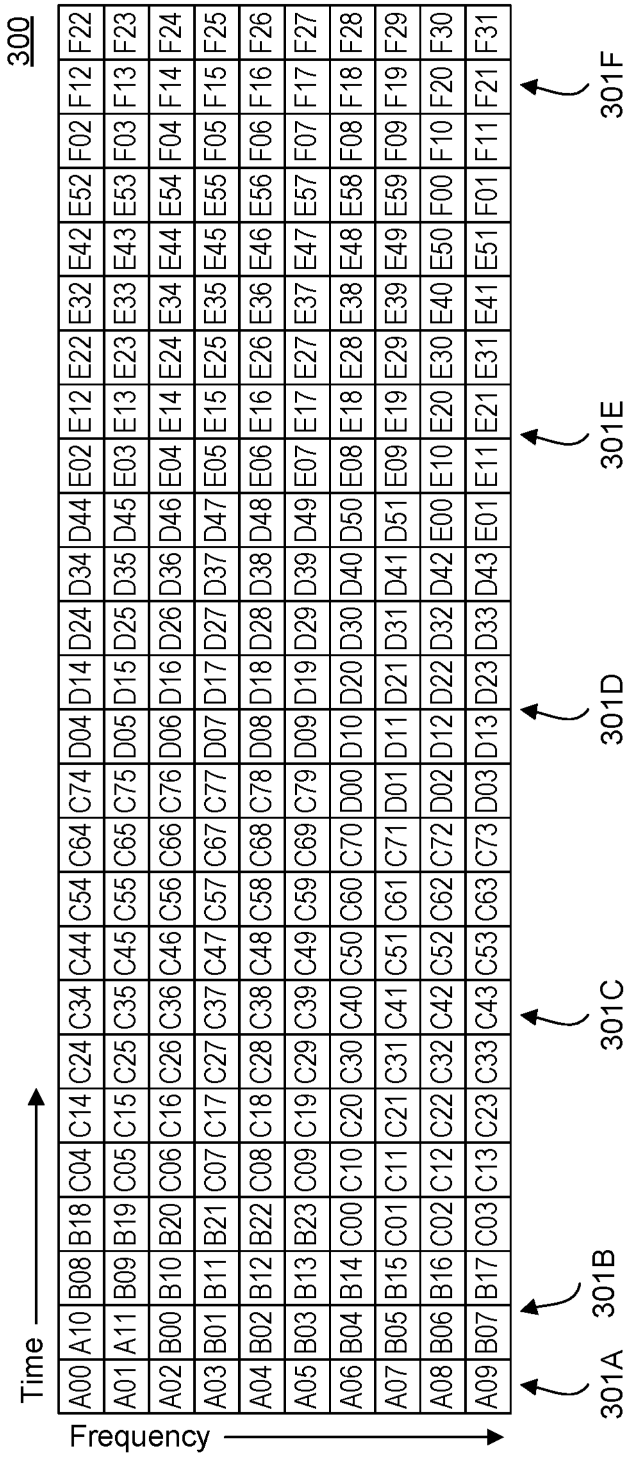
FIG. 3 illustrates multiplexing of PLPs within a subframe according to some embodiments of the disclosure.

FIG. 3 illustrates an example embodiment of a subframe 300 having multiple PLPs 301 multiplexed together in time and frequency. A single frequency-domain unit over a single time-domain unit is termed a "cell." For convenience, FIG. 3 illustrates 10 frequency-domain units over 26 time-domain units, resulting in 260 cells, but a subframe is not limited to such values. For example, a subframe may have more or fewer frequency-domain units, time-domain units, or both, resulting in more or fewer cells.

Subframe 300 multiplexes 6 PLPs: A, B, C, D, E, and F. PLP A occupies 12 cells, PLP B occupies 24 cells, PLP C occupies 80 cells, PLP D occupies 52 cells, PLP E occupies 60 cells, and PLP F occupies 32 cells. In the illustrated embodiment, the PLPs are assigned from top to bottom (increasing frequency) and from left to right (increasing time). However, such mapping is not intended to be limiting on the present disclosure.

Figure 4:
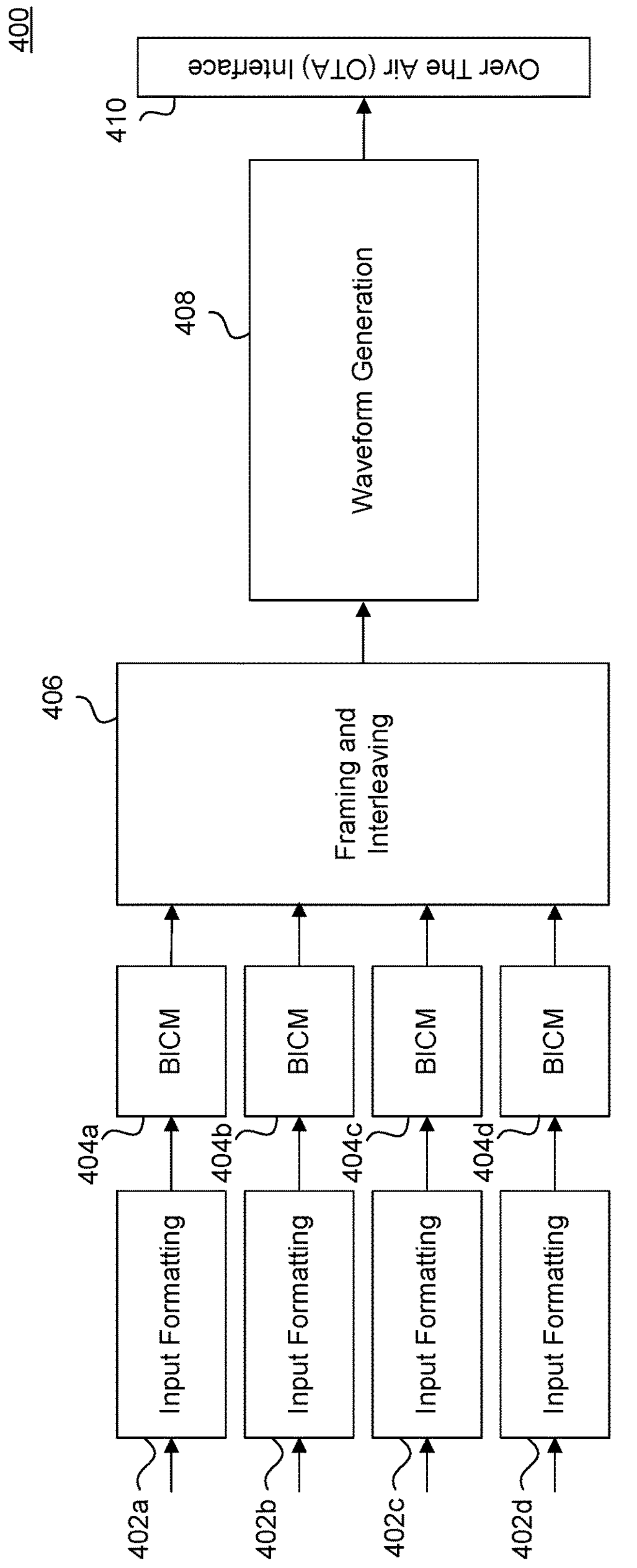
FIG. 4 is a block diagram of a multiple-PLP system architecture according to some embodiments of the disclosure.

The various PLPs may be encoded using mutually distinct parameters between PLPs within a subframe (e.g., subframe 207*a*) or between PLPs of different subframes (e.g., subframe 207*b*) that may be separately signaled in the preamble 203 of physical layer frame 200. FIG. 4 illustrates an example block diagram of an architecture 400 for transmitting multiple PLPs having different encoding requirements. Architecture 400 includes parallel processing branches to accommodate 4 PLPs. Each branch includes an input formatting block 402*a*-402*d* and a BICM block 404*a*-404*d*. The PLPs are then multiplexed together in a framing and interleaving block 406. The output of the framing and interleaving block 406 may be fed into a waveform generation block 408, the output of which may be fed to the over-the-air interface 410.

Figure 5:
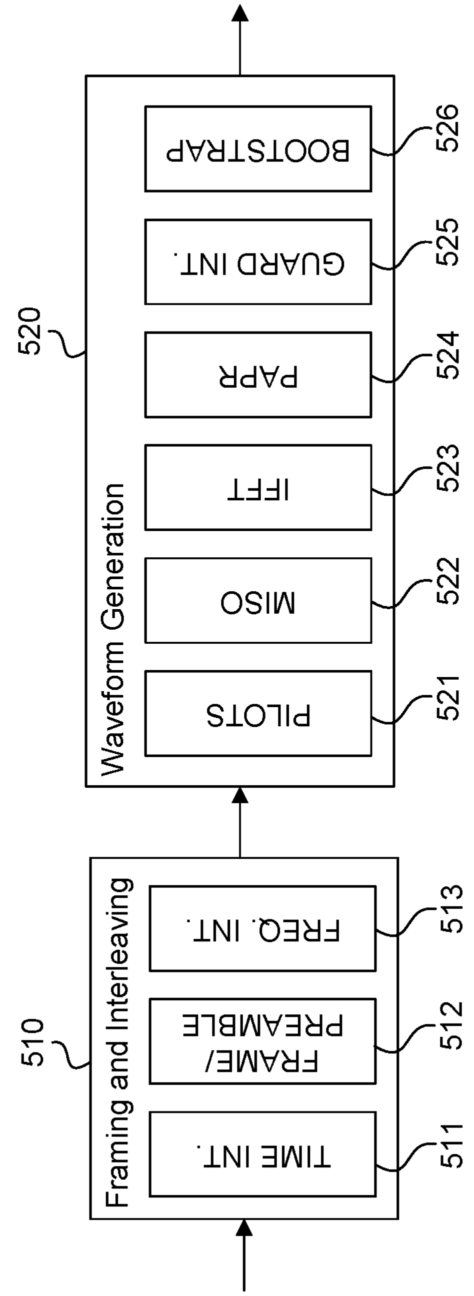
FIG. 5 is a block diagram containing details of framing, interleaving, and waveform generation according to some embodiments of the disclosure.

FIG. 5 illustrates example embodiments of framing and interleaving block 510 and waveform generation block 520. The illustrated framing and interleaving block 510 is an embodiment of framing and interleaving block 406 illustrated in FIG. 4, and waveform generation block 520 is an embodiment of waveform generation block 408 illustrated in FIG. 4. The framing and interleaving block 510 may comprise time interleaving block 511, frame/preamble block 512, frequency interleaving block 513, or a combination thereof. Waveform generation block 520 may comprise pilots block 521, multiple-input single-output (MISO) block 522, IFFT block 523, peak-to-average power ratio (PAPR) block 524, guard interval block 525, bootstrap block 526, or a combination thereof.

Figure 6:
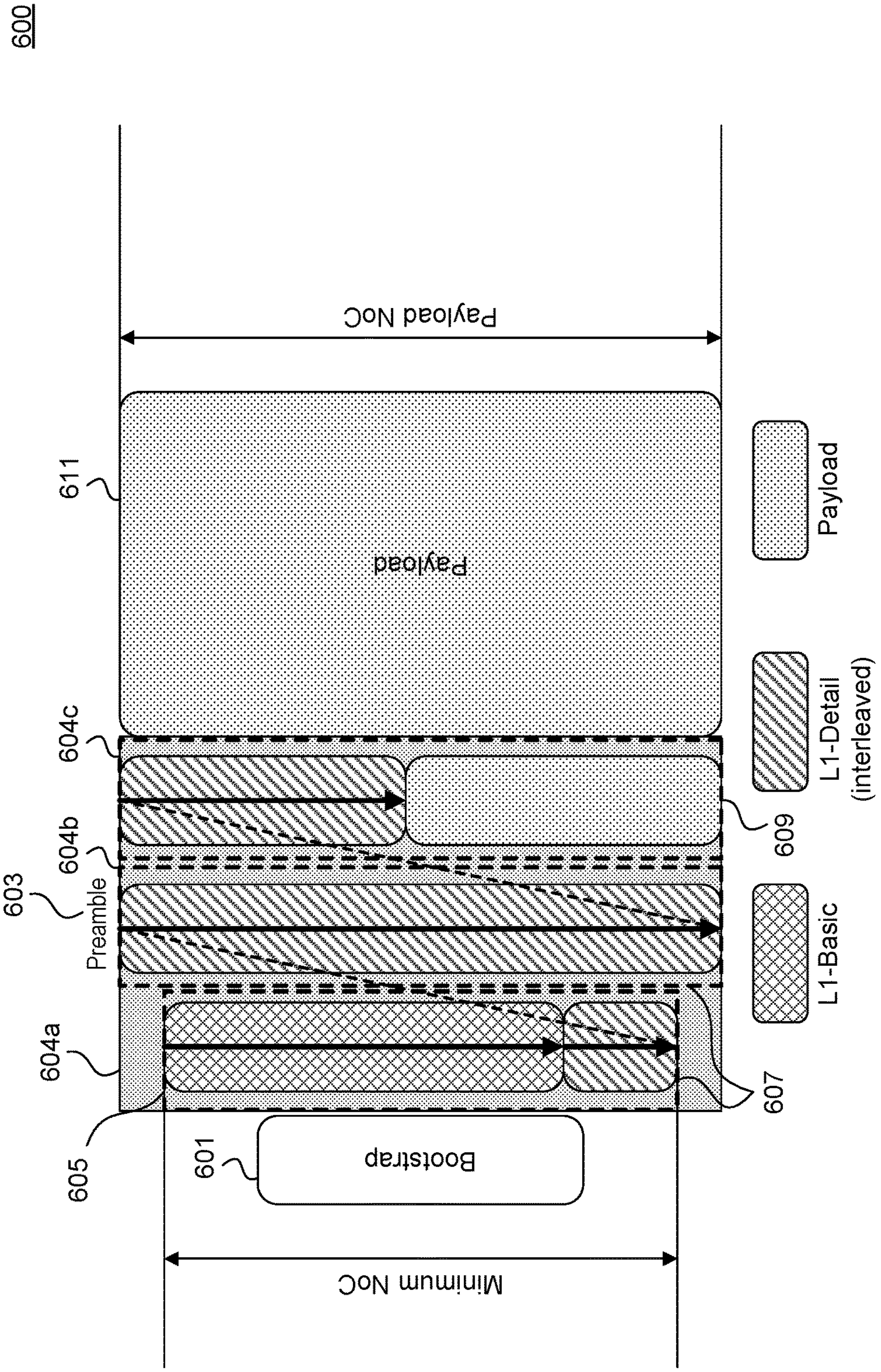
FIG. 6 illustrates the control signaling of a physical layer frame according to some embodiments of the disclosure.

As discussed with respect to FIG. 2, parameters for the input formatting of the individual PLPs may be signaled in the preamble 203 of physical layer frame 200. FIG. 6 illustrates an example of such signaling. Specifically, the preamble 603 of physical layer frame 600 comprises a first signal termed L1-Basic 605, a second signal termed L1-Detail 607, and an initial payload portion 609. The preamble 603 may comprise a plurality of OFDM symbols 604*a*-604*c* as shown in this example, although the preamble may alternatively comprise one OFDM symbol. The first OFDM symbol 604*a* of the preamble 603 may carry data on fewer OFDM subcarriers than any subsequent OFDM symbols 604*b*-604*c* the preamble 603. In some embodiments, the bootstrap 601 precedes the preamble 603, and in some embodiments a payload 611 follows the preamble 603. The bootstrap 601 may occupy a smaller bandwidth than the preamble 603 or payload 611.

L1-Basic 605 may contain a small subset of the overall physical layer control signaling, and therefore may provide sufficient information to allow a receiver to begin receiving the remainder of the physical layer frame 600 and to decode the contents of L1-Detail 607. In some embodiments, L1-Detail 607 contains the majority of the physical layer control signaling and therefore may provide information enabling a receiver to decode some or all of the payload 611.

In some embodiments, the physical layer frame 600 may conform to the ATSC 3.0 A/322 Physical Layer Protocol, dated Jun. 29, 2016, the contents of which are hereby incorporated by reference.

Figure 7:
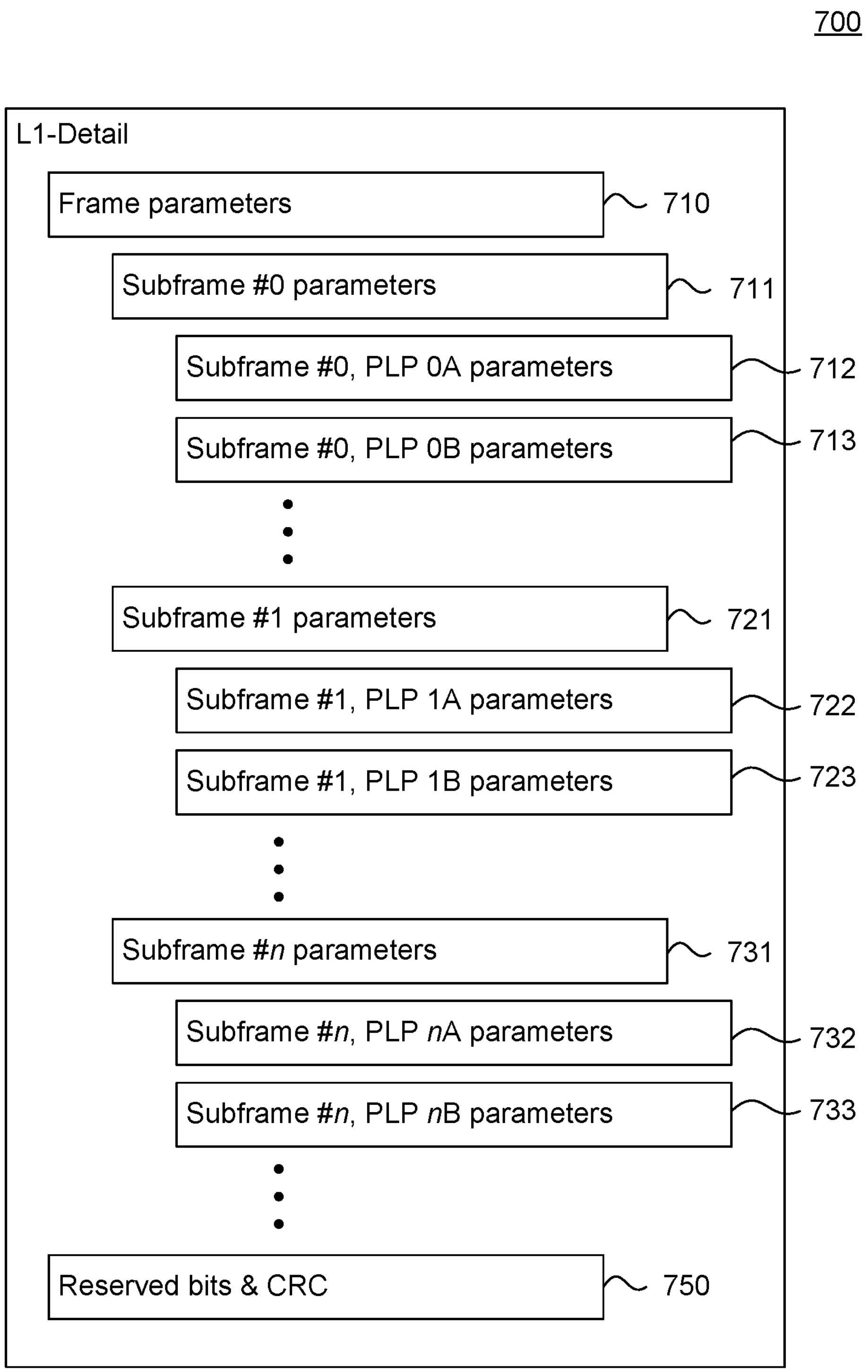
FIG. 7 illustrates an example L1-Detail signaling structure according to some embodiments of the invention.

FIG. 7 illustrates an example embodiment of the control signaling in L1-Detail 700 for an exemplary physical layer frame containing n+1 subframes. Each exemplary subframe in the exemplary physical layer frame comprises a plurality of PLPs, each having a set of parameters. In some embodiments, the frame parameters, the subframe parameters, and the PLP parameters form a parameter portion of the preamble. In some embodiments, the frame parameters 710, which may apply to the entire frame, are positioned at the beginning of L1-Detail 700. In some embodiments, a plurality of subframe parameters 711, 721, 731 follow the frame parameters 710. In the illustrated embodiment, the PLP parameters 712 and 713, corresponding to PLP 0A and PLP 0B, are between the subframe parameters 711 and 721. Both PLP 0A and PLP 0B are in subframe #0 and their parameters 712 and 713, respectively, follow the subframe #0 parameters 711. Similarly, PLP parameters 722 and 723, corresponding to PLP 1A and PLP 1B, follow the subframe #1 parameters 721, and PLP parameters 732 and 733, corresponding to PLP nA and PLP nB, follow the subframe #n parameters 731. Reserved bits and a CRC 750 may be positioned at the end of L1-Detail 700.

In some embodiments, PLP parameters 712, 713, 722, 723, 732, and 733 may include an FEC type parameter termed L1D_plp_fec_type or a TI mode parameter termed L1D_plp_TI_mode. For example, the ATSC 3.0 standard includes 16 possible FEC types, as shown in FIG. 8, although only the first 6 (0000-0101) 801-806 are currently defined. Ten values (0110-1111) 810 are reserved for future use.

FIG. 9 illustrates an example extract 900 of the L1-Detail signaling field that includes portions relevant to L1D_plp_fec_type 902. In some embodiments, other PLP parameters may depend on the value of L1D_plp_fec_type 902. Specifically, in some embodiments, the parameters L1D_plp_mod 904 (indicating the modulation order and type) and L1D_plp_cod 906 (indicating the code rate), are only included in L1-Detail 900 when L1D_plp_fec_type 902 indicates one of the six defined values 0-5 (0000-0101 in binary) 801-806 shown in FIG. 8.

FIG. 10 illustrates the four values defined in the ATSC 3.0 standard for the TI mode. Only the first 3 (00-10) 1001-1003 are currently defined, whereas the fourth (11) 1010 is reserved for future use.

FIG. 11 illustrates an example extract 1100 of the L1-Detail signaling field that includes portions relevant to L1D_plp_TI_mode 1102, which indicates the time interleaving mode to use for time interleaving the encoded data belonging to the current PLP. In some embodiments, other PLP parameters may depend on the value of L1D_plp_TI_mode 1102. For example, in some embodiments, when L1D_plp_TI_mode 1102 has the value '00,' the L1-Detail 1100 contains a 15-bit field termed L1D_plp_fec_block_start 1104. However, when L1D_plp_TI_mode 1102 has the value '01,' the L1-Detail 1100 may contain a 22-bit field termed L1D_plp_CTI_fec_block_start 1106.

FIG. 12 illustrates various parameters associated with each value of the L1-Detail PLP parameter L1D_plp_TI mode according to some embodiments of the disclosure. The number and diversity of these parameters indicates uncertainty as to what parameters would be added to the preamble to accommodate a TI mode of '11.'

As new features are added to the ATSC 3.0 standard, one or more of the currently reserved values for L1D_plp_fec_type 902 and L1D_plp_TI_mode 1102 may be defined in the future. For example, the value '0110' could be used in L1D_plp_fec_type to indicate turbo coding. As another example, the value '11' could be used in L1D_plp_TI_mode to indicate a block interleaver. Other reserved bits in the L1-Detail signaling may be added as well. Such changes may break compatibility such that receivers designed to receive and decode the current ATSC 3.0 standard may not be able to receive and decode future revisions due to their inability to parse the L1-Detail signaling. That is, utilization of currently reserved values in L1-Detail may require other as-yet-undefined parameters having unknown bit length that an ATSC 3.0-compatible receiver would not be able to parse. There is currently no method for introducing such parameters. Thus, introduction of currently-reserved values should be designed carefully in a backward-compatible manner that does not break legacy receiver functionality.

Signaling Total Length of Subframe Parameters

Figure 13:
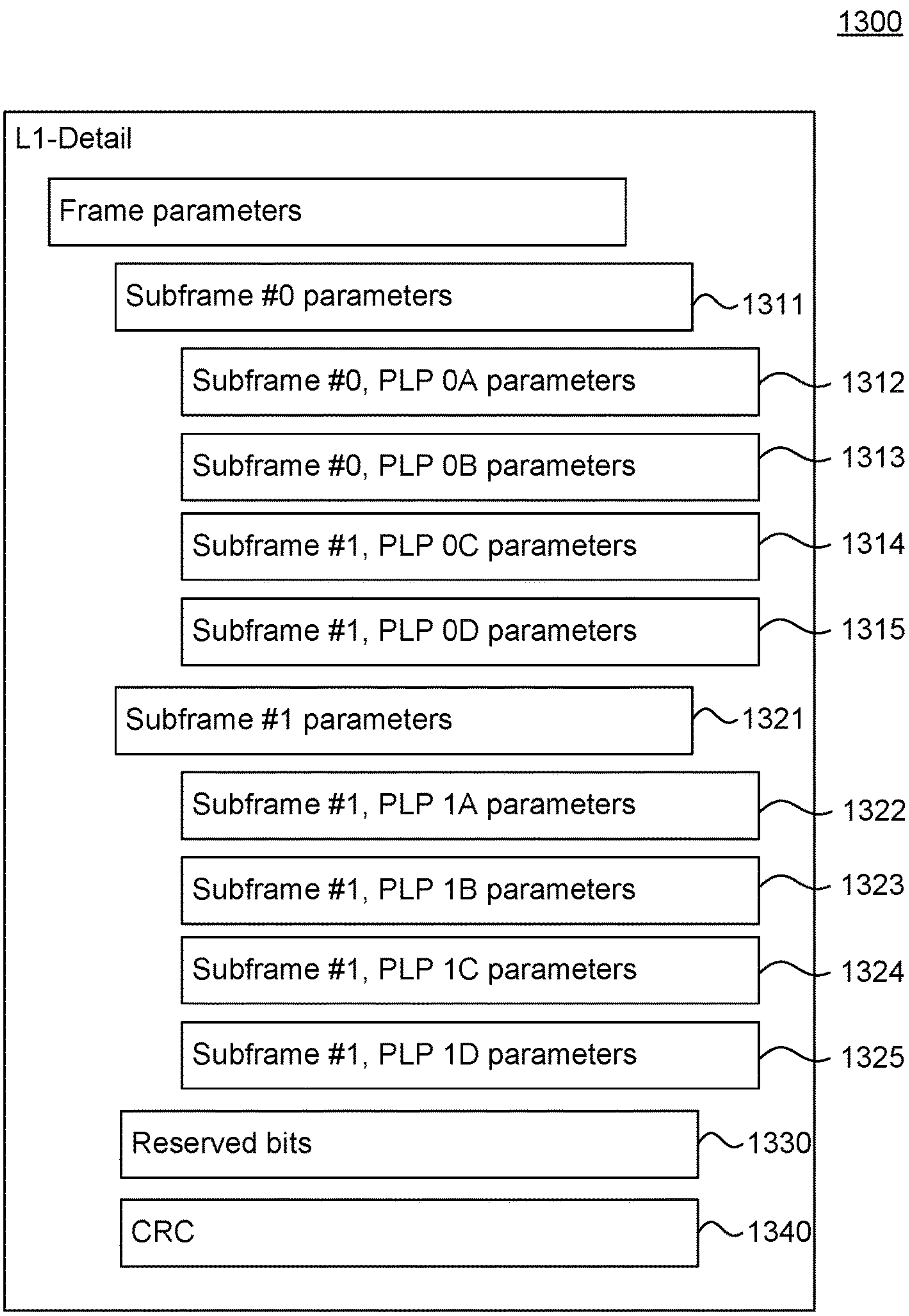
FIG. 13 illustrates an example L1-Detail signaling structure according to some embodiments of the disclosure.

In some embodiments, new parameters required for future features can be inserted into the PLP parameter sets. However, this design can result in a discontinuity for a legacy ATSC 3.0 receiver in parsing the L1-Detail signaling. That is, a physical layer frame may contain one or more PLPs having newly defined parameters and one or more PLPs having legacy ATSC 3.0 parameters. FIG. 13 is an example L1-Detail 1300 for illustrative purposes. The physical layer frame described by L1-Detail 1300 contains two subframes, subframe #0 and subframe #1. Each subframe contains four PLPs, A, B, C, and D. PLP parameters 1312 and 1313 for PLPs 0A and 0B may contain legacy ATSC 3.0 parameters (e.g., only currently-defined L1D_plp_fec_type and L1D_plp_TI_mode values), whereas PLP parameters 1314 and 1315 for PLPs 0C and 0D may contain newly defined values and new parameters associated with the newly defined values.

In the illustrated case, a legacy ATSC 3.0-compatible receiver may be able to parse the PLP parameters 1312 and 1313 but not the PLP parameters 1314 and 1315. Moreover, the legacy ATSC 3.0-compatible receiver may also not be able to parse the PLP parameters 1322-1325 for PLPs 1A-1D, even if those parameters contain only legacy ATSC 3.0 values. This inability occurs because the legacy ATSC 3.0-compatible receiver may not know the lengths of the PLP 0C and 0D parameters 1314 and 1315 in order to skip to the next set of parameters after failing to parse them. Thus, in this example, a legacy ATSC 3.0-compatible receiver is able to recover the control signaling for only half of the PLPs in subframe #0 and for neither subframe #1 nor the PLPs that it contains.

One way to enable a receiver to finish parsing the L1-Detail signaling after failing to parse one PLP parameter set is to add a new signaling field at the beginning of each block of subframe parameters that signals the total bit length (i.e. the number of signaling bits) of that subframe's block of subframe parameters and associated PLP parameters for the PLPs contained in that subframe. An embodiment of this solution is shown in FIG. 14, where new additions to the signaling fields and syntax are highlighted with bold italicized text. The new signaling field L1D_subframe_num_signaling_bits 1402 for subframe i may be set equal to the total number of signaling bits used for the subframe parameters of subframe i and for all of the PLP parameters for the PLPs contained in subframe i. The value $n_{sub\_bits}$ is set to a suitable number of signaling bits, such as 12, 13, 14, or 15, based on the current theoretical maximum size for the signaling bits of a single subframe and the PLPs contained within that subframe.

Returning to the example of FIG. 13, PLP parameters 0C 1314 and 0D 1315 in subframe #0 and PLP parameters 1D 1325 in subframe #1 use a newly-defined value of at least one of L1D_plp_fec_type or L1D_plp_TI_mode, and also introduce one or more new signaling fields associated with this parameter. Because a legacy ATSC 3.0-compatible receiver has no knowledge of these new signaling fields, the legacy ATSC 3.0-compatible receiver is not able to parse or decode any of the PLP parameters 0C 1314, 0D 1315, and 1D 1325. However, with knowledge of the subframe parameters length (L1D_subframe_num_signaling_bits 1402) in FIG. 14, a legacy receiver knows the total length of the signaling bits for subframe #0, and can identify the starting point of the signaling bits for subframe #1 parameters 1321 within L1-Detail 1300 and resume parsing known signaling at the start of subframe #1 parameters 1321.

In some embodiments, the parameter sets for PLPs using legacy signaling are placed first within each subframe block, followed by the parameter sets for PLPs using a later version signaling. These embodiments enable a legacy receiver to skip over PLPs using later version signaling that the legacy receiver does not understand. For example, in FIG. 13, the parameter sets for each of the PLPs using later version signaling (i.e. PLP parameters 0C 1314, 0D 1315, and 1D 1325) are illustrated in positions after the parameter sets for each of the respective PLPs using legacy signaling (i.e. PLP parameters 0A 1312, 0B 1313, 1A 1322, 1B 1323, and 1C 1324). However, in an embodiment, the order of the PLP parameter sets within L1-Detail does not affect the physical positioning of the actual PLP data within the payload portion of the frame.

This solution allows new signaling fields with unknown lengths to be inserted into the existing signaling structure and requires an additional $N_{sub} \times n_{sub\_bits}$ signaling bits, where $N_{sub}$ is the number of subframes in the physical layer frame.

Signaling Total Length of PLP Parameters

Another way to enable a receiver to finish parsing L1-Detail after failing to parse one PLP parameter set is to add a new signaling field at the beginning of each PLP parameter set that signals the total bit length (i.e. the number of signaling bits) of that PLP's parameter set. An embodiment of this solution is shown in FIG. 15, where new additions to the signaling fields and syntax are highlighted with bold italicized text. A new signaling field L1D_plp_num_signaling_bits 1502 for PLP j of subframe i can be set equal to the total number of signaling bits used for that particular PLP. The value $n_{plp\_bits}$ is set to a suitable number of signaling bits, such as 9 or 10, based on the current theoretical maximum size for the signaling bits of a single PLP.

Returning to the example of FIG. 13, PLP parameters 0C 1314, 1B 1323, and 1D 1325 use a newly-defined value of at least one of L1D_plp_fec_type or L1D_plp_TI_mode, and also introduce one or more new signaling fields associated with this parameter. Because a legacy ATSC 3.0-compatible receiver has no knowledge of these new signaling fields, the legacy ATSC 3.0-compatible receiver is not able to parse or decode any of the PLP parameters 0C 1314, 1B 1323, and 1D 1325. However, with knowledge of the PLP parameter length (L1D_plp_num_signaling_bits 1502) in FIG. 15, a legacy receiver knows the total length of the signaling bits for PLP parameters 0C 1314, 1B 1323, and 1D 1325, and can identify the starting point of the signaling bits for the next PLP parameters within L1-Detail and resume parsing known signaling with the next PLP.

With this solution, there is no need to order the PLP parameters according to whether they contain legacy signaling. As shown above relative to FIG. 13, for example, a legacy ATSC 3.0-compatible receiver would not be able to parse or decode the PLP parameter 0C 1314, but would be able to immediately resume parsing the control signaling beginning with PLP parameter 0D 1315. Hence, the control signaling for PLPs using legacy or later version signaling can be arbitrarily ordered within the parameter portion of L1-Detail 1300. However, the new parameter L1D_plp_num_signaling_bits 1502 is preferably placed before any non-compatible signaling within a given PLP parameter set. For example, in PLP parameter set 0C 1314, the parameter L1D_plp_num_signaling_bits 1502 may be placed before the new values for L1D_plp_fec_type or L1D_plp_TI_mode, or any new signaling fields associated with those new values. This allows the legacy receiver to extract the length of the PLP parameter 0C before encountering an unknown parameter.

This solution allows new signaling fields with unknown lengths to be inserted into the existing signaling structure and requires an additional $n_{plp\_bits} \times \Sigma_{i=0}^{N_{sub}-1} N_{plp,i}$ signaling bits, where $N_{sub}$ is the number of subframes in the frame and $N_{plp,i}$ is the number of PLPs in subframe i.

Reserving PLP Parameter Bits for Future Use

In other embodiments, the lengths of the subframe parameters or PLP parameter sets are not included in L1-Detail. Instead, a fixed number of reserved bits can be included in the L1-Detail signaling structure whenever a currently reserved value is used for either L1D_plp_fec_type or L1D_plp_TI_mode. FIG. 16 is an embodiment of the L1-Detail signaling that includes $n_{fec\_bits}$ reserved bits (L1D_plp_fec_reserved_bits 1602) for possible future forward error correction extensibility whenever L1D_plp_fec_type>5 (or >0101 in binary), where new additions to the signaling fields and syntax are highlighted with bold italicized text. The number of reserved bits can be set to an appropriate value such as $n_{fec\_bits}$=8, for example.

Similarly, FIG. 17 is an embodiment of the L1-Detail signaling structure 1700 that includes $n_{ti\_bits}$ reserved bits (L1D_plp_TI_reserved_bits 1702) for possible future time interleaving extensibility whenever L1D_plp_TI_mode=3 (or 11 in binary), where new additions to the signaling fields and syntax are highlighted with bold italicized text. The number of reserved bits can be set to an appropriate value such as $n_{ti\_bits}$=30, for example.

Note that the reserved bits are included in the L1-Detail signaling structures 1600 and 1700 when a currently reserved value of L1D_plp_fec_type or L1D_plp_TI_mode is indicated. In some embodiments, the reserved bits are not present when currently defined values of L1D_plp_fec_type and L1D_plp_TI_mode are indicated, and thus these reserved bits would not result in any signaling inefficiencies for the legacy version of L1-Detail.

If a reserved value of L1D_plp_fec_type or L1D_plp_TI_mode becomes a defined value in a future version of L1-Detail, then $n_{fec\_bits}$ or $n_{ti\_bits}$ (respectively) signaling bits will be available for use by new signaling fields associated with that newly-defined signaling value. The choice of fixed values for $n_{fec\_bits}$ and $n_{ti\_bits}$ accommodate possible future extensibility without using an excessively large number of unused bits (which would lead to signaling inefficiencies in the future).

FIG. 18 is an embodiment of a future L1-Detail signaling structure 1800 for a new value of L1D_plp_fec_type=6, where new additions to the signaling fields and syntax are highlighted with bold italicized text. Here, additional FEC parameters L1D_plp_fec_parameter_0 1810 and L1D_plp_fec_parameter_1 1812 associated with the new FEC type are included using $n_{fec,0}+n_{fec,1}$ of the $n_{fec\_bits}$ previously reserved FEC signaling bits. In some embodiments, previously reserved FEC signaling bits that remain unused in future modifications can be included in a new field L1D_plp_fec_leftover_bits 1820 of length $n_{fec\_bits}-\Sigma n_{fec,i}$ to make the total signaling bit length equal to $n_{fec\_bits}$.

Similarly, FIG. 19 is an embodiment of a future L1-Detail signaling structure 1900 for a new value of L1D_plp_TI_mode=3 (11 in binary), where new additions to the signaling fields and syntax are highlighted with bold italicized text. Here, additional time interleaver parameters L1D_plp_TI_parameter_0 1910 and L1D_plp_TI_parameter_1 1912 associated with the new time interleaving method are included using $n_{ti,0}+n_{ti,i}$ of the $n_{ti\_bits}$ previously reserved TI signaling bits. In some embodiments, previously reserved TI signaling bits that remain unused in future modifications can be included in a new field L1D_plp_TI_leftover_bits 1920 of length $n_{ti\_bits}-\Sigma n_{ti,i}$ to make the total signaling bit length equal to $n_{ti\_bits}$.

Appending New PLP Signaling Fields

In some embodiments, any new fields associated with currently reserved parameter values are not inserted into the existing L1-Detail signaling, but are instead appended following the existing signaling. That is, a PLP parameter set containing new signaling may comprise a legacy portion and a new portion, such that the two portions are not adjacent within the parameter portion of the preamble. A new portion of a PLP parameter set may occur after the legacy portions of all of the PLP parameter sets within the preamble to allow parsing of the legacy portions by a legacy receiver. These embodiments enable legacy ATSC 3.0-compatible receivers to view the new fields as part of the reserved bits 1330, also known as L1D_reserved, illustrated in FIG. 13. The legacy ATSC 3.0-compatible receivers would then be able to skip over the reserved bits and obtain the CRC 1340, sometimes termed L1D_crc, whereas newer receivers can be configured to extract the values indicated in these new signaling fields.

FIG. 20 is an embodiment of a future L1-Detail signaling structure 2000, where new additions to the signaling fields and syntax are highlighted with bold italicized text. Note that all of the existing L1-Detail signaling 2001 is positioned before the new additions. Following that is a new set of nested 'for' loops 2010 and 2011 that iterate across all of the subframes (2010) and all of the PLPs (2011) within each subframe. If a newly-defined value for one or both of L1D_plp_fec_type 2015 and L1D_plp_TI_mode 2017 is indicated, then additional associated parameters 2020-2023 may be included. Note that the new FEC signaling fields 2020 and 2021 would be included in L1-Detail signaling structure 2000 when one or more of the previously reserved values of L1D_plp_fec_type 2015 was indicated for a particular PLP. Similarly, the new TI signaling fields 2022 and 2023 would be included in L1-Detail signaling structure 2000 when a previously reserved value of L1D_plp_TI_mode 2017 was indicated for a particular PLP.

This approach does not require modifications to the existing L1-Detail signaling structure and can therefore be added in the future in a backward compatible manner. Legacy ATSC 3.0-compatible receivers treat the additional signaling fields as reserved bits and ignore their values. In contrast, non-legacy receivers (compatible with the future modifications) may be able to parse the legacy fields and the additional non-legacy fields. In some embodiments, the exact number of signaling bits required for any new signaling fields can be used, so no signaling efficiencies result. Finally, an additional new set of nested 'for' loops can be appended after the existing L1-Detail signaling whenever a new version of L1-Detail is specified using a previously reserved value for one or both of L1D_plp_fec_type or L1D_plp_TI mode. In an embodiment, a receiver may iterate through the multiple sets of 'for' loops illustrated in FIG. 20 to decode the new signals. A legacy ATSC 3.0-compatible receiver, however, may calculate the number of reserved bits 1330 of the L1-Detail signaling 1300 using a signaled size of the L1-Detail signaling 1300.

Redefining the Preamble Structure

In some embodiments, the bootstrap signaling field known as preamble_structure may be used to signal some newly defined parameters. For example, the bootstrap may contain a set of parameters that allow the decoding of L1-Basic to begin. One of the bootstrap signaling fields may be preamble_structure, which indicates basic preamble parameters such as the Fast Fourier Transform (FFT) size, guard interval (GI) length, and preamble pilot density. In some embodiments, the preamble_structure field can additionally indicate an FEC coding method as well as a modulation order and modulation type for L1-Basic.

The currently-defined values for preamble_structure indicate that L1-Basic uses Low Density Parity Check (LDPC) FEC encoding and non-uniform Quadrature Amplitude Modulation (QAM) constellations for any modulation order higher than Quadrature Phase Shift Keying (QPSK, equivalent to 4QAM). However, in some embodiments currently-reserved preamble structure values may be defined to indicate a different type of FEC (e.g. turbo coding), modulation type (e.g. uniform constellations), or both for L1-Basic. One example where it might be desirable to do so would be to enable low-power receivers (such as battery-powered mobile terminals) that might make use of turbo coding instead of the more computationally expensive LDPC FEC. In this situation, defining a different FEC type for L1-Basic may avoid the need to provision a low-power receiver with a high-power LDPC decoder.

Defining currently-reserved values of preamble structure to indicate a different FEC type or modulation constellation type for L1-Basic might not be backward compatible with ATSC 3.0 and, as a result, legacy ATSC 3.0-compatible receivers might not be able to decode any portion of a frame that used newly defined preamble structure values. In this case, the L1-Basic or L1-Detail signaling structures could be reorganized without affecting legacy receivers because those legacy receivers might be unable to begin decoding the preamble contents due to the use of a newly defined L1-Basic encoding, modulation, or both. Such a reorganization of L1-Detail could include the definition of additional values for L1D_plp_fec_type, L1D_plp_TI_mode, and any necessary associated parameters.

Although the embodiments described above focus on L1D_plp_fec_type and L1D_plp_TI_mode, this focus should not be considered to be limiting. The described methods can also be applied to any other signaling field that defines a previously reserved value in a future version of the control signaling and which requires additional associated parameters to accompany that newly-defined signaling value.

It is to be appreciated that embodiments of the disclosure can be implemented by a broadcast system having any combination of hardware, software, or firmware. A broadcast system can include, but is not limited to, a device having a processor and memory, including a non-transitory memory, for executing and storing instructions. A processor can include circuits configured to carry out logic and/or instructions to perform arithmetical, logical, and/or input/output (I/O) operations of the broadcast system and/or one or more components of the broadcast system. Examples of such circuits include field-programmable gate arrays (FPGAs), application-specific integrated circuits (ASICs), digital signal processors (DSPs), and general-purpose processors (GPPs). The memory may tangibly embody the data and program instructions. Software may include one or more applications and an operating system. Hardware can include, but is not limited to, a radio frequency (RF) transmitter including an RF front-end, an antenna, a processor, and a memory. The broadcast system may also have multiple processors and multiple shared or separate memory components.

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for transmitting a physical layer data frame of a broadcast system, the method comprising:

generating a subframe of the physical layer data frame, wherein the subframe comprises a physical layer pipe (PLP);

generating a preamble of the physical layer data frame, wherein the preamble comprises a L1-Basic signaling and a L1-Detail signaling, the L1-Detail signaling comprising a first parameter set associated with the subframe and a second parameter set associated with the PLP, wherein the second parameter set associated with the PLP comprises a forward error correction (FEC) type of the PLP and a time interleaving mode of the PLP, and wherein the first parameter set associated with the subframe comprises a first parameter indicating a total number of bits in the first and the second parameter sets, or the second parameter set associated with the PLP comprises a second parameter indicating a total number of bits in the second parameter set; and wirelessly broadcasting the physical layer data frame comprising the preamble and the subframe.

2. The method of claim 1, wherein the first parameter indicating the total number of bits in the first and the second parameter sets or the second parameter indicating the total number of bits in the second parameter set enables a receiver to skip decoding the second parameter set associated with the PLP in response to the receiver not being able to decode the PLP and to decode a third parameter set associated with a second subframe in the physical layer data frame.

3. The method of claim 2, wherein the receiver is a legacy Advanced Television Systems Committee protocol version 3.0 compatible.

4. The method of claim 1, wherein the second parameter set associated with the PLP comprises a modulation parameter and a code rate parameter associated with the FEC type of the PLP.

5. The method of claim 1, wherein the second parameter set associated with the PLP comprises a parameter associated with the time interleaving mode of the PLP.

6. The method of claim 1, wherein the physical layer data frame further comprises a second subframe, and wherein the preamble further comprises a third parameter set associated with the second subframe.

7. The method of claim 1, wherein the subframe further comprises a second PLP, and wherein the preamble further comprises a third parameter set associated with the second PLP.

8. The method of claim 1, wherein the second parameter set associated with the PLP comprises the second parameter indicating the total number of bits in the second parameter set.

9. An apparatus for transmitting a physical layer data frame of a broadcast system, the apparatus comprising:

a processor configured to:

generate a subframe of the physical layer data frame, wherein the subframe comprises a physical layer pipe (PLP); and generate a preamble of the physical layer data frame, wherein the preamble comprises a L1-Basic signaling and a L1-Detail signaling, the L1-Detail signaling comprising a first parameter set associated with the subframe and a second parameter set associated with the PLP, wherein the second parameter set associated with the PLP comprises a forward error correction (FEC) type of the PLP and a time interleaving mode of the PLP, and wherein the first parameter set associated with the subframe comprises a first parameter indicating a total number of bits in the first and the second parameter sets, or the second parameter set associated with the PLP comprises a second parameter indicating a total number of bits in the second parameter set; and a transmitter configured to wirelessly broadcast the physical layer data frame comprising the preamble and the subframe.

10. The apparatus of claim 9, wherein the first parameter indicating the total number of bits in the first and the second parameter sets or the second parameter indicating the total number of bits in the second parameter set enables a receiver to skip decoding the second parameter set associated with the PLP in response to the receiver not being able to decode the PLP and to decode a third parameter set associated with a second subframe in the physical layer data frame.

11. The apparatus of claim 10, wherein the receiver is a legacy Advanced Television Systems Committee protocol version 3.0 compatible.

12. The apparatus of claim 9, wherein the second parameter set associated with the PLP comprises a modulation parameter and a code rate parameter associated with the FEC type of the PLP.

13. The apparatus of claim 9, wherein the second parameter set associated with the PLP comprises a parameter associated with the time interleaving mode of the PLP.

14. The apparatus of claim 9, wherein the physical layer data frame further comprises a second subframe, and wherein the preamble further comprises a third parameter set associated with the second subframe.

15. The apparatus of claim 9, wherein the subframe further comprises a second PLP, and wherein the preamble further comprises a third parameter set associated with the second PLP.

16. A method for receiving a physical layer data frame of a broadcast system, the method comprising:

receiving, by a receiver, the physical layer data frame comprising a preamble and a subframe, wherein the subframe comprises a physical layer pipe (PLP), the preamble comprises a L1-Basic signaling and a L1-Detail signaling, and the L1-Detail signaling comprises a first parameter set associated with the subframe and a second parameter set associated with the PLP;

parsing, by the receiver, the preamble to extract the first parameter set associated with the subframe and second parameter set associated with the PLP, wherein the second parameter set associated with the PLP comprises a forward error correction (FEC) type of the PLP and a time interleaving mode of the PLP, and wherein the first parameter set associated with the subframe comprises a first parameter indicating a total number of bits in the first and the second parameter sets, or the second parameter set associated with the PLP comprises a second parameter indicating a total number of bits in the second parameter set; and decoding, by the receiver, the PLP based on at least one of the extracted first parameter set or the extracted second parameter set.

17. The method of claim 16, wherein the receiver is compatible with an Advanced Television Systems Committee protocol version greater than 3.0.

18. The method of claim 16, wherein the second parameter set associated with the PLP comprises a modulation parameter and a code rate parameter associated with the FEC type of the PLP.

19. The method of claim 16, wherein the second parameter set associated with the PLP comprises a parameter associated with the time interleaving mode of the PLP.

20. The method of claim 16, wherein the subframe further comprises a second PLP, and wherein the preamble further comprises a third parameter set associated with the second PLP.

* * * * *